United States Patent
Nicholl et al.

(10) Patent No.: US 6,235,228 B1
(45) Date of Patent: May 22, 2001

(54) METHOD FOR ON-MOLD COATING MOLDED ARTICLES WITH A COATING POWDER AS A LIQUID GEL COAT REPLACEMENT

(75) Inventors: Edward G. Nicholl, Reading; Navin B. Shah, Sinking Spring, both of PA (US)

(73) Assignee: Morton International, Inc., Chicago, IL (US)

( * ) Notice: Subject to any disclaimer, the term of this patent is extended or adjusted under 35 U.S.C. 154(b) by 0 days.

(21) Appl. No.: 09/288,765

(22) Filed: Apr. 8, 1999

(51) Int. Cl.[7] .................................................. B29C 39/20
(52) U.S. Cl. ........................ 264/255; 264/258; 264/300; 264/308; 264/331.18; 264/331.21; 264/338
(58) Field of Search ..................................... 264/255, 245, 264/337, 308, 331.18, 331.21, 257, 258, 300, 309, 338; 249/115, 134; 525/27, 44, 45, 49, 38, 46

(56) References Cited

U.S. PATENT DOCUMENTS

| 4,205,028 | 5/1980 | Brueggemann et al. | 264/24 |
|---|---|---|---|
| 4,316,869 | 2/1982 | Van Gasse | 264/255 |
| 4,592,887 * | 6/1986 | Bando et al. | 264/337 |
| 4,980,113 | 12/1990 | Cummings et al. | 264/255 |
| 5,304,332 | 4/1994 | Richart | 264/255 |
| 5,433,165 | 7/1995 | McGuiness et al. | 114/357 |

* cited by examiner

Primary Examiner—Mathieu D. Vargot

(57) ABSTRACT

Method for on-mold surface coating fiberglass-reinforced molded articles during their manufacture with environmentally friendly and physiologically safe thermosetting unsaturated polyester on-mold coating powders which serve as replacements for liquid gel coats. The thermosetting coating powders employed are adapted to cure at low temperatures to avoid causing thermal damage to the heat sensitive plastic molds which must be reused over and over again, and to cure in the presence of atmospheric oxygen to enable over coating with liquid fill resins and fiberglass, which constitute the bulk of the finished article, without having the fill resins bleed through the powder coating film and detrimentally affect the overall quality of the surface finish.

11 Claims, No Drawings

METHOD FOR ON-MOLD COATING MOLDED ARTICLES WITH A COATING POWDER AS A LIQUID GEL COAT REPLACEMENT

FIELD OF THE INVENTION

This is invention relates to the manufacture of molded articles from thermosetting resins with or without glass fiber reinforcement. More particularly, this invention relates to a method for on-mold coating the surface of molded articles during their manufacture with powdered thermosetting resins that serve as replacements for liquid gel coats, to molded articles having surface coatings so formed thereon, and to powdered thermosetting resins adapted for on-mold coating.

BACKGROUND OF THE INVENTION

Liquid gel coat on-mold coating is a known technique for decorating or protecting the surface of a molded article formed from thermosetting resins, whether or not reinforced with glass fibers. In this technique, a liquid gel coat, which becomes the outer surface or skin of the molded article, is sprayed onto the interior wall of a female mold prior to molding the part. After the gel coat layer has hardened sufficiently, one or more liquid thermosetting fill resin layers, with or without glass fiber reinforcement, which constitute the bulk of the finsihed article, are then laid up or sprayed up over the gel coat. Layers are added and allowed to cure as needed to build the article to the desired thickness. After the cure has advanced sufficiently and the gel coat and fill resin layers are integral, the finished coated article is released from the mold which is later reused.

On-mold coating as described above is distinguished from post-mold coating processes, in which the fill resin is molded before the coating is introduced in the mold, and from conventional decorating operations, in which the fill resin is molded and cured in the mold, then released from the mold and decorated with a coating powder or other finish. On-mold coating is also distinguished from in-mold coating processes, in which matching molds are utilized and the coating and fill resin are cured together in a closed molding environment under heat and pressure.

There are a number of drawbacks associated with the use of liquid gel coats during on-mold coating. For instance, liquid gel coats are hard to apply uniformly to the mold surface and overspray must be collected and removed as hazardous waste. Consequently, the transfer efficiency of liquid gel coats is extremely poor (i.e., about 38%). Liquid gel coats also contain alarmingly high levels of volatile organic solvents or crosslinking liquid monomers, such as liquid styrene monomers, which tend to flash away when sprayed on the mold, thus changing the coating formulation, creating bubbles, undesired porosity, and other irregularities in the surface coating, and generating VOC's at unsafe levels, making it necessary to contain and collect the vapor of volatile ingredients. Also, this manner of operation results in long cycle times as the gel coat must be allowed to harden for several hours before application of the fill resin. Lastly, the resulting surface coating, despite being very thick is insufficiently resistant to scratching, cracking, impact, light, heat, moisture, salinity, weathering and solvents.

In view of the foregoing drawbacks, recent emphasis has been placed on finding a suitable replacement for liquid gel coats. High solids and water-borne liquid coatings have been tried, but they fail to deliver the needed performance. Thermosetting coating powders have also been proposed. Coating powders have a number of advantages over liquid gel coats. For instance, they are essentially free of volatile organic solvents, and, as a result, give off little, if any, VOC's to the environment when cured. In addition, coating powders improve working hygiene, as they are in dry, free-flowing, solid form and have no messy liquids associated with them to adhere to workers' clothes and coating equipment. They are relatively non-toxic and in the event of a spill are easily swept up without requiring special cleaning and spill containment supplies. Lastly, oversprayed powders can be recycled during the coating operation and recombined with the original powder feed, leading to very high (i.e., almost 100%) transfer efficiencies and minimal waste generation.

However, thermosetting coating powders are not without problems. Traditionally, they have not been suited for application onto heat sensitive substrates, including plastic molds, such as the unsaturated polyester molds normally employed in the manufacture of molded articles described above, due to the rather high temperatures demanded to melt-flow and cure the powders. Because such molds are rather expensive and must be reused over and over again, thermal damage caused by curing at temperatures above their softening point or plastic deformation temperature cannot be tolerated. While a number of lower temperature curing thermosetting coating powders based on unsaturated polyester resins have been proposed for on-molding coating purposes, they also have suffered from significant drawbacks, such as an inability to sufficiently cure on the surface in an open air molding process, making such powders useful only in a closed molding environment, or an inability to resist blocking or sintering at room temperature, rendering such powders physically unstable and virtually unusable after prolonged storage.

U.S. Pat. No. 4,316,869 (Van Gasse) teaches a method for on-mold coating of molded articles, particularly fiberglass-reinforced boat hulls, with thermosetting coating powders. Specifically disclosed are powdered unsaturated polyester resin formulations containing an unsaturated polyester resin, a copolymerizable cross-linking diallyl ester prepolymer, a cure initiator, along with other common additives. Also required therein is a high-boiling, copolymerizable cross-linking monomer, in particular di- or tri-functional allyl-containing monomers, such as triallyl cyanurate and triallyl isocyanurate. Yet, there are disadvantages to using cross-linking monomers. For instance, such monomers are typically liquids or waxy (low melting) solids at room temperature which have only limited use in coating powders. When employed beyond trace amounts, they tend to dramatically lower the glass transition temperature (Tg) of the formulation, causing the powders to block or sinter during storage and making them virtually impossible to meter and spray during commercial coating operations. Conversion of such materials into higher melting solids is rather expensive and time-consuming.

SUMMARY OF THE INVENTION

It is, therefore, an object of this invention to provide for the manufacture of molded articles formed from thermosetting resins, with or without fiber reinforcement, that avoids the foregoing drawbacks.

More particularly, it is an object of this invention to provide methods for on-mold coating the surface of molded articles formed from thermosetting resins during their manufacture with low temperature cure thermosetting coating powders, molded articles having surface coatings so formed thereon, and low temperature cure thermosetting coating powders adapted for use in said on-mold coating methods, that avoid the foregoing drawbacks.

In accordance with one aspect of this invention, there are provided methods for on-mold coating the outer surface of a molded article formed from thermosetting resins, with or without glass fiber reinforcement, on a heat sensitive (i.e., plastic) female mold surface without damaging the mold, using a low temperature cure thermosetting unsaturated polyester coating powder, which methods comprise: a) providing one of the low temperature cure thermosetting unsaturated polyester coating powder compositions described below; b) applying the coating powder, which becomes the outer surface of the molded article, onto the mold surface, preferably while the mold surface is sufficiently hot to cause the powder particles to melt and flow and spread out over the mold surface and form a substantially continuous film at least along the mold interface; c) heating the powder coated mold surface to melt and flow any solid powder particles and cause the resulting monolithic coating film to cure, preferably to completion; d) applying a compatible liquid thermosetting fill resin, with or without glass fiber reinforcement, which constitutes the bulk of the molded article, onto the cured coating powder film and allowing the cure of the fill resin to advance sufficiently until the powder coating and fill resin are integral; and, e) removing the molded article from the mold as the finished coated article. In the aforesaid method, the coating powder application and curing steps b) and c) are preferably carried out in an open air environment, i.e., while the mold is opened and exposed to ambient conditions.

In accordance with another aspect of this invention, there are provided thermosetting coating powders adapted for said on-mold coating methods, which powders are melt extrudable, storage stable, readily fluidizable, not only curable in an open air environment but also at sufficiently low temperatures to not cause damage to plastic molds, and furthermore are capable of providing a surface coating that is exceptionally smooth, uniform, glossy and attractive in appearance with little or no surface porosity, resistant to scratching, impact, cracking, staining, light, heat, moisture, salinity, weathering, and solvents, and one that forms a very strong bond with the thermosetting fill resin, wherein the powders consist essentially of a reactive film-forming blend in particulate form of: a) an ethylenically unsaturated polyester resin; b) a copolymerizable cross-linking ethylenically unsaturated prepolymer; c) a thermal initiator; d) optional cure catalyst; and, e) a mold release agent, with the proviso that: I) the particulate blend is essentially free of any copolymerizable cross-linking ethylenically unsaturated monomers; and, preferably with the further proviso that: ii) either the unsaturated polyester resin contains at least one active hydrogen atom, or said particulate blend further consists essentially of a photoinitiator alongside the thermal initiator, or both. In the above on-mold coating method, if the coating powder includes a photoinitiator, prior to or following heating step c), the coating film is exposed to sufficient ultraviolet or ionizing radiation to effect radiation curing along the surface exposed to air.

A first preferred on-mold coating powder useful in this invention consists essentially of a particulate blend of a) an unsaturated polyester resin containing active hydrogen atoms obtained by the condensation of an ethylenically unsaturated dicarboxylic acid (or anhydride), e.g., maleic anhydride or fumaric acid, and a diol possessing active hydrogen atoms, e.g., 1,4-cyclohexane dimethanol, to reduce air inhibition of cure at the exposed surface and improve flow out behavior at low temperatures, along with minor amounts of aromatic dicarboxylic acid (or anhydride) and aromatic diols, e.g., a combination of phthalic anhydride and hydrogenated bisphenol A, respectively, to raise the Tg of the resin such that the powdered blend remains physically stable and solid at room temperature, together with b) a cross-linking difunctional allyl ester prepolymer, e.g., isodiallyl phthalate, c) a peroxide thermal initiator, e.g., a peroxy ketal, d) a redox catalyst, e.g., a cobalt salt, and e) a mold release agent, and the usual additives.

A second preferred on-mold coating powder useful in this invention consists essentially of a particulate blend of a) an unsaturated polyester resin containing maleate or fumarate unsaturation, b) a cross-linking difunctional vinyl ether urethane prepolymer, c) a peroxide thermal initiator, e.g., a peroxy ketal, d) a redox catalyst, e.g., cobalt salt, e) a mold release agent, and f) a photoinitiator, e.g., a benzyl ketal, acyl phosphine, or aryl ketone, together with the usual additives.

In yet another aspect of this invention, there are provided molded articles, with or without fiber reinforcement having surface coatings formed thereon by the aforesaid on-mold coating methods.

The various objects, features and advantages of this invention will become more apparent from the following description and appended claims.

DETAILED DESCRIPTION OF THE PREFERRED EMBODIMENTS

Throughout this specification, all parts and percentages specified herein are by weight unless otherwise stated. Also, in the following description of the coating powders used to form the outer skin of the molded product, component a) (the unsaturated polyester resin) and component b) (the copolymerizable cross-linking unsaturated prepolymer) are herein considered to be the "resin" and equal to 100 parts. Levels of other components are calculated as parts relative to 100 parts of the resin (abbrev. "phr").

On-Mold Coating Powders

The coating powders useful in the practice of this invention are low temperature cure powdered thermosetting unsaturated polyester resin formulations adapted to be applied to a mold surface and form an outer skin on a resinous body molded thereon without damaging the mold. These coating powders consist essentially of a reactive film-forming particulate blend of an ethylenically unsaturated polyester resin, a cross-linking ethylenically unsaturated prepolymer, a thermal initiator, optional cure catalyst, and a mold release agent, with the proviso that the particulate blend is essentially free of any cross-linking ethylenically unsaturated monomers. In order to achieve sufficient surface cure in an open air molding environment as contemplated in this invention, the powders are preferably further characterized in that either the unsaturated polyester resin possesses an active hydrogen atom, or the particulate blend further consists essentially of a photoinitiator alongside the thermal initiator, or both. It is particularly important for any unsaturated polyester coating powder employed in an open atmosphere on-mold coating process to be able to achieve complete cure along the inner surface of the coating exposed to air, as this prevents the liquid fill resin from bleeding through the powder coating film and marring the appearance of the outer surface finish.

The unsaturated polyester resins useful in the practice of this invention can be obtained in a conventional manner, such as by condensation of one or more di- or polyfunctional carboxylic acids or their anhydrides, preferably dicarboxylic acids or their anhydrides, with one or more di- or polyfunctional alcohols, preferably dihydric alcohols. The ethylenic unsaturation is usually supplied by the acid, although it is possible to supply it instead through the polyol. The unsaturation can be provided in the polymer backbone or at the end of the chain. If it is supplied in the backbone, ethylenically unsaturated di- and polyfunctional acids or their anhydrides useful for this purpose include maleic anhydride, fumaric acid, itaconic anhydride, tetrahydrophthalic anhydride, nadic anhydride, dimeric methacrylic acid, etc. Maleic anhydride, fumaric acid, or their mixtures are generally preferred because of economic considerations. It should be understood that whether acids or anhydrides are listed, any of these forms are contemplated for use herein. If unsaturation is supplied at the chain end, ethylenically unsaturated monofunctional carboxylic acids (or their esters) are employed, for example, acrylic acid, methacrylic acid, etc.

Often, minor amounts of saturated aliphatic and aromatic di- and polyfunctional carboxylic acids or their anhydrides are employed in conjunction with the ethylenically unsaturated acids to reduce the density of the ethylenic unsaturation and provide desired chemical and mechanical properties. Examples of suitable saturated aliphatic and aromatic polyfunctional acids (or anhydrides thereof) employed to tailor the properties of the resin (e.g., to raise the Tg of the resin) include adipic acid, succinic acid, sebacic acid, phthalic anhydride, isophthalic acid, terephthalic acid, dimethylterephthalate, dimethylisophthalate, tetrahydrophthalic acid, hexahydrophthalic acid, cyclohexane dicarboxylic acid, dodecane dicarboxylic acid, trimellitic acid, pyromellitic anhydride, etc.

As described above, to enable surface curing of the exposed surface of the coating film in an open air molding environment, it is desirable that the polyester resin contain an active hydrogen atom in its backbone. The term "active hydrogen" used herein means a hydrogen atom that is readily abstracted by free radicals and participates in the curing reaction. The active hydrogen atoms are typically supplied by the polyol, although it may instead come from active hydrogen containing acids employed in conjunction with the unsaturated acid. Examples of di- or polyfunctional alcohols useful herein which contain active hydrogen atoms include those with allylic, benzylic, tertiary alkyl, or cyclohexyl hydrogen atoms. These active hydrogen atoms are readily abstracted during free radical-induced curing and form corresponding allylic, benzylic, cyclohexyl, and tertiary alkyl free radicals, all of which promote curing at the exposed surface. While not wishing to be bound by theory, it is believed that inclusion of an active hydrogen containing compound in the unsaturated polyester molecule allows for the generation of free radicals which have greater stability and are less susceptible to permanent deactivation upon contact with atmospheric oxygen.

Examples of suitable di- or polyfunctional alcohols possessing active hydrogens include alcohols having: an allylic hydrogen, such as trimethylol propane monoallyl ether, trimethyol propane diallyl ether, vinyl cyclohexanediol, etc.; a benzylic hydrogen, such as benzene dimethanol, etc.; a tertiary alkyl hydrogen, such as methyl propanediol, butylethyl propanediol, etc.; and, a cyclohexyl hydrogen, such as cyclohexane dimethanol, cyclohexane diol, etc. As mentioned above, it is also possible to supply the active hydrogen through the carboxylic acid. Examples of suitable di- or polyfunctional carboxylic acids with active hydrogens include carboxylic acids having: a malonyl hydrogen, such as malonic acid, etc.; or an allylic hydrogen, such as nadic anhydride, tetrahydrophthalic anhydride, dimer acid, etc.

Often, polyols without active hydrogens are employed in the condensation reaction in conjunction with a substantial proportion of active hydrogen containing polyols to provide desired chemical and mechanical properties. Typically, between about 10 and 100 mole %, and preferably between about 50 and 100 mole %, of the hydroxyl functionality relative to the total hydroxyl functionality of monomers used to form the unsaturated polyester resin A) is supplied by active hydrogen containing polyol monomers, the balance being non-active hydrogen containing polyols. Examples of suitable di- or polyfunctional alcohols that do not contain active hydrogens employed to tailor the properties of the resin (e.g., to raise the Tg of the resin) include ethylene glycol, diethylene glycol, triethylene glycol, propylene glycol, neopentyl glycol, butanediol, dodecanediol, hydrogenated bisphenol A, bisphenol A/propylene oxide adducts, glycerol, trimethylolpropane, trimethylolethane, etc.

Whether the polyester is acid-functional or hydroxyl-functionalized depends upon the —COOH/—OH ratio of the monomer mix. While these saturated functionalities generally do not participate in the curing reaction which proceeds primarily through the unsaturated groups, they are often used to achieve desired chemical and mechanical properties in the final polymer. If the unsaturated polyester is acid-functional, the acid number is usually about 1 to 80. If the unsaturated polyester is hydroxyl-functional, the hydroxyl number is usually about 5 to 100.

The unsaturated polyester resin can be formulated to be either crystalline (i.e., semi-crystalline) or amorphous resins. Crystalline resins or blends of crystalline and amorphous resins are desirable for forming powder coatings with low melt viscosities and good flow out behavior at low temperatures. It is well known in the art that certain alcohol and acid monomers impart crystallinity to unsaturated polyesters. For example, symmetrically substituted linear monomers or cyclic monomers or their mixtures are generally used to form crystalline polyesters. Examples of suitable diols that are known to promote crystallinity include ethylene glycol, butanediol, hexanediol, and cyclohexane dimethanol. Examples of suitable dicarboxylic acids that are known to do the same include terephthalic acid, adipic acid, dodecane dicarboxylic acid, and cyclohexane dicarboxylic acid.

Most desirably, the unsaturated polyesters suitable for the practice of this invention are solid materials substantially above room temperature, so that they can be easily formulated into coating powders that will not block or sinter during ambient storage. On the other hand, the unsaturated polyesters should have low enough melt temperatures and melt viscosities at said temperatures to enable the coating powders formulated therefrom to melt, flow and readily spread out over the entire mold surface below the deformation temperature of the mold. It should be understood that what determines the above properties of the coating powders is generally the unsaturated polyester resin component used therein, as this comprises the major portion of the resin.

The unsaturated polyester resins, therefore, preferably have a molecular weight in the range of about 400 to 10,000, and more preferably 1,000 to about 4,500, a glass transition temperature (Tg) sufficiently high to prevent sintering at room temperature up to about 90–100° F. a Tg preferably about 105 to 150° F., and more preferably about 105 to 120° F. and a melt viscosity sufficiently low to enable the powder after melting to fully wet out the mold surface at the desired mold temperature and form a smooth film thereon with virtually no surface porosity, preferably a melt viscosity at 175° C. (347° F.) below about 5,000 centipoise, and more preferably between about 3,750 to 4,750 centipoise. The degree of unsaturation, preferably maleate or fumarate unsaturation, normally present in such polyester resins is preferably in the range of about 2 to 20 wt.% of the polyester resin, and more preferably about 4 to 10 wt.%.

The unsaturated polyester resin is blended with a copolymerizable cross-linking ethylenically unsaturated prepolymer or oligomer which upon curing reacts with linear polyester chains to cross-link them and thereby impart thermoset properties to the coating. The cross-linking prepolymers useful in the practice of this invention are preferably difunctional compounds which are solids at room temperature. Such solid resins generally include prepolymers containing vinyl ether, vinyl ester, allyl ether, allyl ester, acrylate or methacrylate groups at the chain ends. Examples of suitable prepolymers include allyl esters, such as diallyl phthalates, iso-diallyl phthalates, and p-diallyl phthalates, which are obtained by the reaction product of allyl alcohol and phthalic anhydride; allyl ethers, such as those obtained by reaction of allyl propoxylate and hydrogenated methylene diisocyanate, etc; vinyl ethers, such as divinyl ether urethanes, including those obtained by the reaction of hydroxybutyl vinyl ether either with diisocyanates, isocyanate-terminated alcohol adducts, or isocyanurates, etc.; and, methacrylates or acrylates, such as methacrylated or acrylated urethanes, including those formed by the reaction of hydroxyethyl or hydroxypropyl methacrylate or acrylate with diisocyanates, etc. The cross-linking prepolymers, like the unsaturated polyesters, can be formulated to have either a crystalline or amorphous microstructure. This will depend on choice of monomers employed in the formation reaction, as is well known in the art, and the desired flow out behavior and final coating properties. It will be appreciated by those skilled in the art that the amount of unsaturated prepolymer relative to the unsaturated polyester resin will depend on the choice of materials employed. Usually, such materials are employed in the necessary amount to allow cross-linking to proceed to completion. In general, this translates into less than about 25 wt.% of the resin comprising cross-linking prepolymer.

A thermal initiator is employed to generate free radicals and induce cross-linking of the polyester resin to a thermoset state. The thermal initiators useful herein are desirably solids at room temperature and are preferably selected from peroxide and azo compounds. Examples of suitable peroxide initiators include peroxy ketals, such as 1,1-bis(t-butylperoxy)- 3,3,5-trimethylcyclohexane, diacyl peroxides, such as benzoyl peroxide, peroxy esters, dialkylperoxides, ketone peroxides, etc., with peroxy ketals being preferred. It is most desired that the activity of the initiator be such as to enable curing to proceed below the deformation temperature of the mold, preferably below about 325° F., while not causing substantial curing in the extruder during standard melt processing. It is, therefore, particularly desired to employ thermal initiators which have a one hour half life between about 105 and 135° F. The amount of thermal initiator employed in the coating powder composition of the present invention typically ranges between about 0.1 and 10 phr, and preferably between about 1 and 5 phr.

Standard photoinitiators can also be used in conjunction with the thermal initiators for photoactivated (i.e., radiation) curing. As described above, thermal curing of the powder composition may be assisted along the exposed surface by compounds which form free-radicals under photolytic conditions, e.g., upon exposure to sufficient ultraviolet radiation or ionizing, e.g., electron beam, radiation. This is especially important with the powders based on unsaturated polyesters that do not contain active hydrogen atoms. As with the thermal initiators, the photoinitiators should be solid compounds at room temperature. Of course, if they are liquids, as with any of the other materials employed in the powders, they can be converted to solids by absorption onto inert filler before use, as is well known in the art. Yet, liquids should be avoided whenever possible. Examples of suitable photoinitiators include benzoin ethers, benzyl ketals, such as benzyl dimethyl ketal, acyl phosphines, such as 2,4,6-trimethylbenzoyl diphenylphosphine oxide, and aryl ketones, such as 1-hydroxycyclohexyl phenyl ketone, etc. The photoinitiators, if included, are generally employed in an amount sufficient to enable radiation curing along the surface of the coating film exposed to air. Typically, this translates to a range between about 0.1 and 10 phr, and preferably between about 1 and 5 phr.

Accelerators or catalysts, particularly redox catalysts, may also be employed in the coating powder to induce the generation of free radicals and allow the cross-linking reactions to proceed at faster rates. As redox catalysts, transition metal compounds based on a fatty acid or oil may be employed. Examples of suitable metals include cobalt, manganese, lead, copper, and vanadium. Cobalt-containing compounds, especially cobalt salts of monocarboxylic (i.e., fatty) acids, for example, cobalt octoate, cobalt neodecanoate, cobalt naphthenate, and cobalt octadecanoate, are most preferred. During curing, at the surface of the coating, even the free radicals formed at the active hydrogen sites tend to react with atmospheric oxygen to form hydroperoxides (i.e., inactivated peroxide initiators), which caps the free radicals and halts the curing reaction. Yet, the hydroperoxides so formed, due to their location, are readily decomposed in the presence of the cobalt salts to re-initiate the free radical cure, thus allowing the cure to proceed to completion at the surface. The redox catalysts are generally employed in the coating powder in amounts of less than about 1.0 phr, and preferably in the range between about 0.1 and 0.5 phr.

Also contained in the coating powders of this invention are internal mold release agents or lubricants. These lubricating materials promote mold parting after curing. Examples of suitable mold release agents include metallic soaps of fatty acids, such as zinc stearate, copolymers of organophosphate esters, and modified fatty acids, etc. The mold release agents are employed in an amount sufficient to enable release of the cured coating from the mold after the molded article is completed. The release agents are generally employed in the coating powder this invention in a range between about 0.1 and 10 phr, and preferably in a range between about 2 and 5 phr.

As described above, the unsaturated polyester on-mold coating powders of this invention are virtually free of any copolymerizable cross-linking ethylenically unsaturated monomers, such as those previously mentioned herein and further described in U.S. Pat. No. 4,316,869, the teaching of which is incorporated herein by reference in its entirety. Accordingly, the blocking resistance of these powders is substantially improved, enabling electrostatic spray application of the powders on the mold surface and the formation of high quality coatings with minimal surface imperfections.

It should be understood that the coating powders of this invention may also contain the usual other additives. For instance, the coating powders may include conventional pigments and/or fillers, typically in an amount up to 120 phr, to impart the desired color and opacity to the coating film, although clear (i.e., unpigmented) coatings are also possible. Suitable pigments include inorganic pigments, such as titanium dioxide, and organic pigments, such as carbon black, etc. Suitable fillers include calcium carbonate, barium sulfate, wollastonite, mica, china clay, diatomaceous earth, boric acid, low molecular weight nylon, etc. Other common additives, such as gloss control agents, flow or leveling agents, dry flow additives, anticratering or degassing agents, texturing agents, light stabilizers, ultraviolet absorbers, antioxidants, etc., typically in a total amount of up to about 15 phr, may also be included. Suitable gloss control agents include polyethylene waxes, oxidized polyethylenes, polyamides, teflons, polyamides, etc; flow control agents include acrylic resins, silicone resins, etc; dry flow additives include fumed silica, alumina oxide, etc; anticratering or degassing agents include benzoin, benzoin derivatives, low molecular weight phenoxy and phthalate plasticizers, etc; texturing agents include organophilic clays, cross linked rubber particles, multiple curatives, etc; light stabilizers include hindered amines, etc. Suitable UV absorbers include benzotriazoles, etc; antioxidants include organophosphites, hindered phenolics, etc.

The melting temperatures and curing temperatures of the above powders will vary somewhat depending on the various ingredients employed. However, it is particularly important that the coating powders possess the ability to melt-flow and readily coalesce into a smooth film with little or no surface porosity at temperatures and for times that are safe for the plastic molds, while at the same time remaining physically stable under ambient storage conditions and chemically unreactive during conventional melt-processing. In accordance therewith, the coating powders useful in the practice of this invention are formulated to be dry, free-flowing solid particulates at ambient temperatures and exhibit no sintering at temperatures at least up to 90° F., preferably up to about 110° F. In addition, the coating powders desirably have a melt temperature (i.e., flow temperature) below about 250° F., preferably in the range of about 120 to 160° F., and a cure temperature below about 350° F., preferably in the range of about 250 to 300° F., temperatures consistent with application of the coating powder compositions onto plastic molds.

Of course cure is time-dependent as well as temperature dependent; however, a full cure at the above temperatures can be achieved within a commercially reasonable time, for example in about 30 minutes or less, preferably in about 15 minutes or less. The preferred powder coatings of this invention can effect a full cure at between about 250–300° F. in about 5 minutes or less which is safe for most heat sensitive applications. A "full cure" is a degree of curing achieved at which additional time at elevated temperature will not improve the properties of the coating once cooled to ambient temperatures. For thermosetting coating powders, the level of cure can be measured by the solvent resistance of the coating. Typically, a fully cured coating will withstand up to about 50 double rubs using methyl ethyl ketone (MEK) solvent without rubbing through to the coated substrate. A double rub is a rub back and forth with a solvent-saturated swab using normal hand-applied pressure.

Coating Powder Preparation

The coating powders of this invention are prepared in the usual manner. First, an intimate mixture is formed by dry blending together all of the formulation ingredients in a mixer. The dry blend is then melt blended in a mixing extruder with heating above the melting point of the resin and other ingredients, where necessary, so that the extrudate is a thorough and homogeneous mixture. Extrusion is preferably carried out at between about 180 and 250° F., to minimize any curing and gelation from taking place in the extruder. Gaseous or supercritical fluid, e.g., $CO_2$, may be charged to the extruder to reduce the extrusion temperatures. The extruded composition is rapidly cooled and solidified and then broken into chips. Next, the chips are ground in a mill with cooling, and, as necessary, the particulates are screened and sorted according to size. Average particle size desired for electrostatic application is generally between about 20 and 60 microns.

Liquid Fill Resins

Thermosetting liquid fill resins, which constitute the bulk of the finished article, useful in the practice of this invention are well known in the art. The particular fill resin chosen should have a chemistry that is compatible with the coating powder to avoid adhesion problems in the molding. These problems are manifested as bubbles between the fill resin and coating of the finished part, or as insufficient adhesion between the fill resin and coating. It is, therefore, particularly advantageous to employ unsaturated polyester liquid fill resin formulations to match the chemistry of the coating powders. Such fill resins typically consist of unsaturated polyester resins and cross-linking monomers, e.g., styrene, along with the usual additives, such as thermal initiators, hardening accelerators or catalysts, retardants, thickening agents, and fillers.

Mold

The present invention contemplates the use of a female mold of the type commonly employed in the manufacture of the molded articles from thermosetting resins, with or without glass fiber reinforcement. Most often, heat sensitive plastic molds, e.g., unsaturated polyester molds, are used which have an inner surface in the shape of the article to be molded. The molds also usually contain conductive pigments, e.g., carbon black, blended therein which render their surfaces sufficiently conductive for electrostatic coating. Since these molds are rather expensive and are required to be reused over and over again, the coating powder must be able to melt-flow and cure at temperatures below the softening point or plastic deformation temperature of the molds. The plastic deformation temperature of such molds is typically between about 375 and 450° F. Significant thermal damage occurring to the mold surface during on-mold coating (e.g., cracking, blistering and warping) cannot be tolerated, as this will not only detrimentally affect the final shape of the finished article, but also will affect the overall quality of the surface finish.

On-Mold Coating Methods and Products

The method of this invention for forming an on-mold coated molded article begins by providing one of the thermosetting unsaturated polyester coating powder compositions described above and a plastic female mold having a shape-imparting surface defined by the interior wall of the mold. In an open atmosphere, particles of the unsaturated polyester formulation are applied to the surface of the mold, and then heated so as to melt the particles, whereupon they flow and readily spread out forming a substantially continuous and preferably wholly continuous film lining the mold surface. Preferably, the mold surface is preheated prior to the deposition of the unsaturated polyester particles, to cause the powder particles as they strike the hot mold, to immediately melt, flow, wet out and coalesce into a substantially continuous coating film that at least lines the mold interface. The mold may be treated with a mold release agent and/or a conductive wash prior to powder application if so desired.

In the method above, the initial preheating step is usually carried out in a preheat station housing banks of high intensity, short-, medium-, or long-wave infrared (IR) lamps directed over the mold surface for surface warming only, although conventional convection ovens or combination IR and convection ovens may be used. Medium-wave IR lamps are generally preferred. The final temperature of the mold surface reached during the preheat should be sufficiently high (but still below the mold deformation temperature), such that by the time the mold is transferred from the preheat station to the powder application area, the surface temperature will not fall below the temperature needed to melt the powder particles, at least at the mold interface. Time and temperature of the preheat will vary somewhat depending on the coating powders employed.

For the aforementioned powders, the surface temperature of mold as it leaves the preheat station is preferably about 325° F. Because the temperature of the room is usually about 70 to 80° F., the mold surface temperature will quickly fall to a much lower value than 325° F. by the time the mold reaches the powder coating area which is preferably a short distance away. However, as the preheated mold enters the powder coating station, the mold surface temperature should still be above the temperature needed to cause the powder particles as they strike the hot mold surface to immediately melt, flow and wet out the entire mold surface. For the aforementioned powders, the surface temperature of the mold immediately prior to powder coating is preferably about 200 to 250° F. Such preheating is advantageous for a number of reasons. For example, preheating enhances initial powder attraction to the mold surface, reduces the time needed to cure the powders, results in a more uniform cure, and most importantly allows for the development of coating films with the desired smoothness (i.e., no orange peel) and gloss (i.e., a 60° gloss value of about 85 or higher) with minimal surface porosity. While preheating is preferred, the coating powders may be applied to a mold surface at ambient temperature followed by post-melt and curing, although less attractive films are generally produced.

After leaving the preheat station, the mold is preferably moved to a powder spray booth located a short distance away from the preheat station, wherein the coating powder particles are applied to the hot mold surface by electrostatic spraying. While application by electrostatic means is preferred, any other conventional powder coating process may be used to apply the powder particles. The powder spray booth typically houses banks of corona discharge or triboelectric spray guns and a powder reclaim system. Successive layers are applied as needed to obtain thicker films. Films having a thickness after curing of about 5 to 30 mils are most often used. Powder application can usually be effected within 1 to 2 minutes. It should be understood that while it is important to have the powders that strike the mold surface to completely melt and coalesce into a continuous coating lining the mold to derive the full benefit of the aforesaid coating powders, due to ambient cooling and the cooling effect of powder coating itself, the powder particles applied over the interface powders may remain unmelted or partially melted until final curing.

After powder application, the powder coated mold is then moved to a powder cure station preferably located a short distance away from the powder spray booth. The powder cure station may be one and the same with the powder preheat station. In the powder cure station, the mold surface is heated again preferably using IR lamps as described above to a temperature sufficient to melt and flow any unmelted powder particles and cure the resulting monolithic coating film on the mold surface, preferably to completion. Although it is possible to maintain the coating film in a partially cured state until the fill resin is added and then cure both resins simultaneously to a final cure, it is preferred to fully cure the unsaturated polyester film prior to adding the fill resin to prevent the fill resin from bleeding into the powder coating film.

Therefore, in the powder cure station, the powder coated mold surface is heated to a temperature equal to or above the coating powder cure temperature and below the deformation temperature of the mold and maintained at that level until a complete powder cure is effected, thereby forming a hardened thermoset coating film on the mold surface having an outer surface (defined herein as the surface against the mold surface) and an opposed inner surface exposed to an open air environment. Time and temperature of the final cure will vary somewhat depending on the coating powders employed and conditions of use. However, for the aforementioned coating powders, the mold surface is preferably heated to temperature between about 300 and 350° F. for about 2 to 5 minutes to effect full cure.

If a photoinitiator is employed in the coating powder, the coating film is additionally exposed for a sufficient time to radiation, such as ultraviolet or electron beam radiation, to enable radiation curing of the exposed inner surface of the coating film. Ultraviolet radiation is generally preferred. Radiation curing, if employed, is usually carried out after powder curing in a radiation cure station preferably located a short distance away from the powder cure station. Ultraviolet radiation is typically supplied by medium pressure mercury or doped mercury vapor lamps, such as Fusion H-, D- and/or V-lamps, for a sufficient time, e.g., between about 1 millisecond and 10 seconds, typically less than about 3 seconds, to activate the photoinitiator and initiate photopolymerization at the inner surface. Radiation curing could also be effected immediately after powder application provided that the applied powder particles have completely melted on the mold surface.

Further the method described above, after the powder coating film has been cured, the mold is transferred to a molding station, wherein the inner surface of the cured coating film is contacted at the exposed interface with a liquid fill resin. The liquid fill resin may be applied by means of spatulas, brushes, rollers, and sprayers. The pertinent techniques are known by the names of hand lay-up and spray-up. The hand lay-up technique involves placing glass mat or other reinforcing materials in the mold and saturating the reinforcement material with the fill resin. In the spray-up technique, a mixture of loose glass fibers and fill resin are sprayed into the mold. Successive layers are added and allowed to cure as needed to build the molded article to the desired final thickness. This bulk layer may also be formed by a technique known as resin transfer molding in which dry reinforcement materials are placed in a mold cavity defined by one or more mold surfaces and liquid fill resin is then injected into the cavity to form the molded product, sometimes under vacuum.

After the cure of the fill resin layer has advanced sufficiently and the coating film and fill resin are integral across their interface, the shaped article can be removed from the mold. Before or after removal, application of other layers consisting of materials of a different kind, for example, fiber reinforced cement, foamed polymer, or combination of both, on the fill resin layer is also possible. When the molded product is removed from the mold, the coating powder film defines the outer surface of the molded body with complete faithfulness to the mold configuration.

In summary, this invention provides a method for on-molding coating molded articles formed from thermosetting resins, with or without fiber reinforcement, with thermosetting coating powders in an open atmosphere, surprisingly without causing thermal damage to the heat sensitive molds (e.g., cracking, blistering, warping, etc.) during melting and curing, or without producing inferior surface coatings that lack the desired non-porosity, smoothness, gloss, glamour, luster, uniformity, intercoat adhesion, and/or resistance to scratching, impact, cracking, light, heat, moisture, salinity, weathering and solvents. What makes such an on-mold coating method possible is that the thermosetting coating powders employed are uniquely formulated to melt, flow out, and coalesce into a smooth film and attain full cure, even along the surface exposed to air, on the molds at extraordinarily low temperatures and/or rapid speeds, while still being storage stable and melt extrudable.

This invention will now be described in greater detail by way of specific examples.

EXAMPLE 1

Preparation of Unsaturated Polyester Resin Containing Active Hydrogen Atoms This is an example of an unsaturated polyester resin found to be especially useful in the practice of this invention. 0.85 mole (122.4 g) of 1,4-cyclohexane dimethanol was charged into a 0.5 liter resin kettle fitted with a partial condenser, total condenser, stirrer, nitrogen inlet, and temperature controller. While introducing a stream of nitrogen at rate of 25–30 ml/min and stirring, the temperature was raised to 257° F. (125° C.). Thereafter, 0.6 mole (88.8 g) of phthalic anhydride, 0.5 mole (58 g) of fumaric acid, 0.5 mole (36 g) of hydrogenated bisphenol A, and 50 ppm of 4-methoxy phenol (antioxidant) were added to the kettle. Still under agitation and nitrogen sparge, the temperature was slowly raised to 356° F. (180° C.) while the water of esterification was collected. When 85–90% of the theoretical distillate had been collected, the nitrogen sparge rate was increased to 200 ml/min. Viscosity and acid value of the resin were checked periodically until the desired values were obtained. The amorphous resin was then discharged into a pan, cooled and ground into flakes. Multiple runs were made and the resins had properties within the ranges provided in the table below.

| Properties | Example 1 |
| --- | --- |
| Glass Transition Temperature (Tg) | 42–47° C. |
| Melting Point | 52–57° C. |
| Acid Number (mg KOH/g resin) | 47 |
| ICI viscosity @ 175° C. (350° F.) | 3750–4750 cps |
| Molecular Weight (Mn) by CrPc | 1700–1850 |

EXAMPLE 2

Preparation of Unsaturated Polyester On-Mold Coating Powders

The following ingredients were blended together in the given manner and amounts to form three different on-mold coating powder formulations (A, B, C) of this invention.

| | Parts By Weight | | |
| --- | --- | --- | --- |
| Ingredients | A | B | C |
| DRY BLEND IN KNEADER UNTIL HOMOGENEOUS | | | |
| Unsaturated Polyester (from Example 1) | 95 | | |
| Pioester 277-FLV (Unsaturated Polyester)[1] | | 95 | |
| Isodiallyl Phthalate (Diallyl Ester Prepolymer) | 5 | 5 | |
| Lupersol 231XL (Peroxide Initiator)[2] | 4.5 | 4.5 | 2 |
| Uralac XP3125 (Unsaturated Polyester)[3] | | | 80 |
| Uralac ZW-3307 (Divinyl Ether Prepolymer)[4] | | | 20 |
| Surfonyl 104-S (Flow Agent)[5] | 1 | 1 | 1 |
| Modaflow 2000 (Acrylic Flow Agent)[6] | 1 | 1 | 1 |
| Moldwiz P-66 (Release Agent)[7] | 3 | 3 | 3 |
| Cobalt Neodecanoate (Redox Catalyst)[8] | 0.1 | 0.1 | 0.2 |
| TR 93 TiO$_2$ (Pigment)[9] | 20 | 20 | 20 |
| R-8098 Red (Iron Oxide Pigment)[10] | 0.01 | 0.01 | 0.01 |
| Raven Black 22 (Carbon Black Pigment)[11] | 0.014 | 0.014 | 0.014 |
| MELT BLEND IN TWIN SCREW EXTRUDER AT 180° F. | | | |
| COOL EXTRUDATE AND BREAK INTO CHIPS | | | |
| CHARGE CHIPS AND 0.2 WT. % ALUMINUM OXIDE C[12] TO BRINKMANN MILL | | | |
| GRIND TO POWDER AND SCREEN TO −140 MESH | | | |

Table Footnotes
[1]Pioester 277-FLV is an unsaturated polyester resin containing CHDM and having a Tg of 36° C., a melt viscosity of 8,000 centipoise at 175° C., and an acid number of 12, sold by Pioneer Plastics.
[2]Lupersol 231XL is a peroxy ketal thermal free-radical initiator based on 1,1-bis(t-butylperoxy)3,3,5-trimethylcyclohexane, sold by Elf Atochem.
[3]Uralac XP3125 is an unsaturated polyester resin having a Tg of 51° C. and an acid number of 10 max, sold by DSM Resins.
[4]Uralac ZW-3307 is a crystalline divinyl ether terminated urethane prepolymer having a Tm of 90 to 110° C., sold by DSM Resins.
[5]Surfonyl 104-S is an acetylenic diol flow agent, sold by Air Products.
[6]Modaflow 2000 is an acrylic copolymer flow agent, sold by Mozel Inc.
[7]Moldwiz P-66 is a mold release agent which contains copolymers of organophosphate esters and modified fatty acids, sold by Axel Plastics.
[8]Cobalt neodecanoate is a cobalt salt, sold by OMG Americas.
[9]TR 93 is a titanium dioxide pigment, sold by Tioxide Americas.
[10]R-8098 Red is an iron oxide pigment, sold by Whittaker, Clark and Daniels.
[11]Raven Black 22 is a carbon black pigment, sold by Columbian Chemicals.
[12]Aluminum Oxide C is a fumed alumina dry flow additive, sold by Sullivan Associates.

EXAMPLE 3

On-Mold Coating Method

A polished unsaturated polyester mold surface was heated to a temperature between 300° F. and 325° F. under medium-wave IR lamps at 42% intensity, after which one of the aforesaid powders (A, B, C) was electrostatically sprayed onto the interior wall of the mold with a corona discharge spray gun within 1 minute from the mold leaving the IR lamps to cause the interface powder particles to melt and form a continuous coating lining the mold surface. For 2 minutes after the application of the powder, the powder coated mold was again placed under the medium-wave IR lamps and heated to a surface temperature of about 350° F., during which time the unmelted powder particles above the interface powders were caused to melt and coalesce into the coating film and cure the coating film to a thermoset state. Thereafter, the mold was allowed to cool to ambient temperature. Subsequently, alternating layers of fiberglass matting and fill resin were applied to the exposed side of the cured powder coating film by hand lay-up and then the fill resin was allowed to cure at ambient temperature. After fill resin has sufficiently cured, the resulting product was removed from the mold and tested. This procedure was repeated for each of the aforesaid powders (A, B, C) with the exception that powder (C) was post-cured after IR curing with UV radiation by passing the mold under a gallium doped Fusion-V lamp for 1–3 seconds. Performance properties of the individual coating powders (A, B, C) and the coating films formed therefrom are given below.

| Results | A | B | C |
|---|---|---|---|
| Gel Time at 400° F. (sec) | 11 | 9 | 10 |
| Hot Plate Melt Flow at 375° F. (mm) | 44 | 45 | 70 |
| Sintering Resistance at 110° F. under 100 g weight for 12 hours | Good | Fair | Good |
| MEK Resistance (50 Double Rubs) | No Rub Off 4–5 | No Rub Off 4–5 | No Rub Off 4–5 |
| Smoothness (Orange Peel) | None | None | None |
| Porosity | No | Yes | No |
| Intercoat Adhesion (Boiling Water) | No Blisters | No Blisters | No Blisters |
| 60° Gloss | 89 | 89 | 91 |
| 20° Gloss | 74 | 70 | 78 |
| Coating Adhesion (ASTM D-3359) | Good | Good | Good |
| Coating Flexibility | Very Good | Very Good | Very Good |
| Xenon Arc Weatherometer (ASTM G-26-92A) (1500 hours) | Excellent No Observable Deterioration | Not Tested | Good Slightly Better Than Gel Coat |

EXAMPLE 4

Comparison Between On-Mold Coating Powders Of Prior Art and Invention

The following ingredients were blended together in the same manner as in example 2 to form two different on-mold coating powder formulations, one formulation (I) being made in accordance with this invention, and the other formulation (P) being made in accordance with the general teachings of U.S. Pat. No. 4,316,869.

| | Parts By Weight | |
|---|---|---|
| Ingredients | I | P |
| Unsaturated Polyester (from Example 1) | 95 | |
| Aropol 7501 (Unsaturated Polyester)[1] | | 80 |
| Triallyl Cyanurate (Monomer)[2] | | 8 |
| Isodiallyl Phthalate (Diallyl Ester Prepolymer) | 5 | 20 |
| Lupersol 231XL (Peroxide Initiator) | 4.5 | 4.5 |
| Surfonyl 104-S (Flow Agent) | 1 | 1 |
| Modaflow 2000 (Acrylic Flow Agent) | 1 | 1 |
| Moldwiz P-66 (Release Agent) | 3 | 3 |
| TR 93 $TiO_2$ (Pigment) | 7 | 7 |

Table Footnotes
[1]Aropol 7501 is an unsaturated polyester resin free of CHDM having a Tg of 60° C., sold by Ashland Chemical.
[2]Triallyl Cyanurate (TAC) is a cross-linking unsaturated monomer having a melting point of 27° C..

It was then attempted to apply each formulation to a mold surface in the same manner as in example 3. However, it was found that formulation (P) experienced severe blocking at room temperature, i.e., after ½ hour exposure to room temperature (about 72° F.) the powder particles turned into a non-fluidizable solid clump. Upon attempting to sp formulation (P) through the corona discharge gun after breaking up the blocked powders mechanical agitation, the powders still jammed in the gun and had to be mechanically released in the gun by a jig wire in order to coat the mold surface. While the final film properties achieved after curing formulation (P) were only slightly worse than those of formulation (I), formulation (P) due to its extremely poor blocking resistance is entirely an unacceptable formulation for use in commercial electrostatic coating operations.

Performance properties of the individual coating powders (P, I) and the coating films formed therefrom are given below.

| Results | I | P |
|---|---|---|
| Gel Time at 400° F. (sec) | 6 | 25 |
| Hot Plate Melt Flow at 375° F. (mm) | 55 | 74 |
| Sintering Resistance at 110° F. under 100 g weight for 12 hours | Good | Very Poor |
| Free Flowing Powder at Rm Temp. | Yes | No Solid Clump After ½ Hour |
| MEK Resistance (50 Double Rubs) | No Rub Off | No Rub Off |
| Smoothness (Orange Peel) | None | None |
| 60° Gloss | 91 | 82 |
| 20° Gloss | 80 | 76 |
| Xenon Arc Weatherometer (ASTM G-26-92A) (600 hours) | Excellent No Observable Deterioration | good signs of chalking |

From the foregoing it will be seen that this invention is one well adapted to attain all ends and objects hereinabove set forth together with the other advantages which are apparent and inherent. Since many possible variations may be made of the invention without departing from the scope thereof, the invention is not intended to be limited to the embodiments and examples disclosed, which are considered to be purely exemplary. Accordingly, reference should be made to the appended claims to assess the true spirit and scope of the invention, in which exclusive rights are claimed.

What is claimed is:

1. A method for on-mold coating a molded article in an open plastic mold, comprising:

a) providing a thermosetting unsaturated polyester coating powder composition which consists essentially of an unsaturated polyester resin containing active hydrogen atoms and having a melt viscosity at 175° C. of between 3,750 and 4,750 centipoise, a copolymerizable cross-linking prepolymer, and a thermal initiator, with the proviso that the composition is essentially free of a copolymerizable cross-linking monomer;

b) applying said coating powder composition, which becomes the outer skin of the molded article, onto a shape-imparting mold surface;

c) heating said powder coated mold surface to a temperature sufficient to flow and coalesce the coating powder into a substantially continuous coating film and effect cure, with the temperature being below the mold deformation temperature;

d) applying a fill resin, which constitutes the bulk of the molded article, onto said cured powder coating and allowing the cure of the fill resin to advance sufficiently until said powder coating film and fill resin are integral; and, e) releasing said finished coated article from said mold.

2. The method of claim 1, wherein said coating powder composition further consists essentially of a photoinitiator.

3. The method of claim 1, wherein said coating powder composition further consists essentially of a cure catalyst.

4. The method of claim 1, wherein said coating powder composition further consists essentially of a mold release agent.

5. The method of claim 1, wherein prior to step b) the mold surface is preheated to a temperature sufficient to flow and coalesce the coating powder into a substantially continuous film lining the mold surface as the powder strikes the mold surface during step b).

6. The method of claim 1, wherein said fill resin is an unsaturated polyester fill resin.

7. The method of claim 1, wherein said fill resin is admixed with glass fibers.

8. The method of claim 1, wherein the bulk of the article is formed in step e) by successively applying and curing as needed layers of fill resin and glass fiber matting over said cured powder coating.

9. The method of claim 1, wherein said coating powder composition consists essentially of an unsaturated polyester resin containing active hydrogen atoms, a copolymerizable unsaturated prepolymer, a thermal initiator, a cure accelerator, and a mold release agent.

10. The method of claim 9, wherein said unsaturated polyester resin is formed by reacting an unsaturated dicarboxylic acid or anhydride thereof selected from the group consisting of fumaric acid and maleic anhydride, with an active hydrogen containing diol at least comprising cyclohexane dimethanol, along with minor amounts of aromatic dicarboxylic acid or anhydride thereof at least comprising phthalic anhydride and an aromatic diol at least comprising hydrogenated bisphenol A.

11. The method of claim 1, wherein said coating powder composition consists essentially of an unsaturated polyester resin, a copolymerizable unsaturated prepolymer, a thermal initiator, a photoinitiator, a cure catalyst, and a mold release agent.

* * * * *